United States Patent Office 2,798,886
Patented July 9, 1957

2,798,886

PREPARATION OF CYCLOALKANONE-SEMICARBAZONES

Lorraine Guy Donaruma, Woodbury, N. J., assignor to E. I. du Pont de Nemours and Company, Wilmington, Del., a corporation of Delaware No Drawing. Application August 1, 1955,
Serial No. 525,791

4 Claims. (Cl. 260—554)

The present invention relates to a novel process for the production of a caprolactam intermediate, and, more specifically, to a novel process for the production of cyclohexanone semicarbazone.

Lactams are used for the production of polyamides suitable for use as fabrics, films, fibers, coating compositions, and the like. Heretofore, the usual preparation of the lactams has been by Beckmann rearrangement of cyclic ketoximes. Caprolactam, the most important member of this class, has long been prepared by rearrangement of cyclohexanone oxime, and many modifications and improvements in this process are known in the art. In my co-pending application, Serial No. 525,792, filed August 1, 1955, a novel process is described for the production of caprolactam wherein cyclohexanone semicarbazone and sodium nitrite are mixed in concentrated sulfuric acid containing at least one mole of water per mole of cyclohexanone semicarbazone. In view of this process, the availability of cyclohexanone semicarbazone is important.

Accordingly, an object of the present invention is to provide a process for the production of cyclohexanone semicarbazone. Another object of the present invention is to provide an efficient process for converting water-soluble salts of nitrocyclohexane to useful products. A still further object is to provide a process for the preparation of alkanone and cycloalkanone semicarbazones generally. Other objects will become apparent as the invention is further described.

I have found that the foregoing objects may be accomplished when I add an aqueous solution of an alkali metal salt of a secondary nitro alkane or nitro cycloalkane to a dilute mineral acid solution of a mineral acid salt of semicarbazide.

In accordance with the process of the present invention, an aqueous solution of an alkali metal salt, e. g., the sodium salt, of a nitro alkane or nitro cycloalkane, e. g., nitrocyclohexane, is added to a dilute mineral acid solution, e. g., a sulfuric acid solution, of a mineral acid salt of semicarbazide, e. g., semicarbazide hydrochloride, at a temperature between the freezing point and the boiling point of water.

The following examples serve to illustrate specific embodiments of the method of carrying out the process of the present invention. However, they should not be construed to limit the invention in any manner. The parts in the examples are parts by weight.

Example 1

One part of nitrocyclohexane was dissolved in 25 parts of water containing 1 part of sodium hydroxide. The solution obtained was added at room temperature (25° C.) to 45 parts of a 20% sulfuric acid solution containing 1 part of semicarbazide hydrochloride (1 to 1 molar ratio of semicarbazide hydrochloride to nitrocylohexane). When the addition was complete, the reaction mixture was neutralized and the product was removed by filtration. The dried product represented 0.9 part (83% yield) of cyclohexanone semicarbazone (M. P. 162° C.).

Example 2

The procedure of Example 1 was followed in preparing a solution of the sodium salt of nitrocyclohexane, except that the following quantities (parts) were used: nitrocyclohexane, 1.3; sodium hydroxide, 0.4; and water, 5.0. The solution prepared was added to 20 parts of a 10% sulfuric acid solution chilled to 0° C. and containing 1.1 parts of semicarbazide hydrochloride (1 to 1 mole ratio of semicarbazide hydrochloride to nitrocyclohexane). After completion of the addition, the procedure of Example 1 was used to recover the product. Cyclohexanone semicarbazone was obtained in the amount of 1.09 parts, a yield of 71%.

Example 3

A solution of the sodium salt of nitrocyclohexane was prepared as in Example 2, and this solution was added at room temperature to 20 parts of a 10% sulfuric acid solution containing 2.2 parts of semicarbazide hydrochloride (ratio of two moles of semicarbazide hydrochloride per mole of nitrocyclohexane). Cyclohexanone semicarbazone was obtained in the amount of 1.34 parts (87% yield) when the work-up procedure of Example 1 was employed.

As the foregoing examples show, cyclohexanone semicarbazone was obtained in good yield in the process of the present invention when an aqueous solution of the sodium salt of nitrocyclohexane was added to a dilute mineral acid solution of semicarbazide hydrochloride. The process may be carried out at a temperature between the freezing point of water (0° C.) and the boiling point of water (100° C.), although economic considerations may make preferable the use of a temperature range in which no external heating or cooling of the reaction mixture is required (20–30° C.).

The preceding examples additionally show that a good yield of the desired semicarbazone is obtained when one stoichiometric equivalent of the semicarbazide hydrochloride to the salt of nitrocyclohexane is used. However, as Example 3 shows, the use of more than one equivalent of the semicarbazide hydrochloride in the present process in not deleterious.

The process of the present invention has been illustrated by the preparation of cylohexanone semicarbazone. However, other cycloalkanone and alkanone semicarbazones may be prepared by means of the present process, e. g., cyclopentanone semicarbazone, methylcyclohexanone semicarbazone, cycloheptanone semicarbazone, acetone semicarbazone, and the like. Correspondingly, the alkali metal salts of nitro cycloalkanes and nitro alkanes other than the sodium salt of nitrocyclohexane can be used in the present process, e. g., salts of nitrocyclopentane, methylnitrocyclohexane, nitrocycloheptane, nitroethane, 2-nitropropane, and the like. Likewise, the semicarbazide hydrochloride can be replaced by other semicarbazide salts of mineral acids. Dilute sulfuric acid was employed in the preceding runs, but the use of other mineral acids, such as dilute hydrochloric acid, is also possible.

The preceding examples, particularly Example 1, illustrate a means of recovering the cylohexanone semicarbazone produced in the process of the present invention. For example, following the addition of the aqueous solution of the sodium salt of nitrocyclohexane to the dilute mineral acid solution of semicarbazide hydrochloride, the reaction mixture can be neutralized by any suitable basic material and the cyclohexanone semicarbazone which precipitates can be separated therefrom, e. g., by filtration.

The cyclohexanone semicarbazone prepared by the process of the present invention is an important caprolactam intermediate and is readily rearranged to caprolactam by the process described in my co-pending application mentioned above. However, the use of the semicarbazone is not limited to the production of lactam; for example, cyclohexanone semicarbazone is an important insecticide which is disclosed in U. S. Patent 2,374,479, issued April 24, 1945, to be toxic, e. g., to screwworm larvae, the Hawaiian and southern webworms, and the cross-striped cabbage worm. Cyclohexanone semicarbazone is also suitably used as an intermediate for chemical syntheses and the like. The other alkanone and cycloalkanone semicarbazones likewise are valuable insecticides and chemical intermediates.

The invention has been described in detail in the foregoing, and it will be apparent to those skilled in the art that many variations may be introduced without departing from the spirit and scope of the invention. I intend, therefore, to be limited only by the following claims.

I claim:

1. A process which comprises adding an aqueous solution of the sodium salt of nitrocyclohexane to a dilute mineral acid solution of semicarbazide hydrochloride at a temperature between the freezing point and the boiling point of water at least a stoichiometric equivalent of said semicarbazide salt to said nitrocyclohexane salt being used.

2. Process as claimed in claim 1, wherein the dilute mineral acid solution is a dilute sulfuric acid solution.

3. A process for the production of cyclohexanone semicarbazone which comprises adding an aqueous solution of the sodium salt of nitrocyclohexane to a dilute sulfuric acid solution of semicarbazide hydrochloride at a temperature between the freezing point and the boiling point of water at least a stoichiometric equivalent of said semicarbazide salt to said nitrocyclohexane salt being used, neutralizing the reaction mixture, and thereafter recovering cyclohexanone semicarbazone.

4. A process for the production of a cycloalkanone semicarbazone which comprises adding an aqueous solution of an alkali metal salt of a nitro cycloalkane to a dilute mineral acid solution of a mineral acid salt of semicarbazide at a temperature between the freezing point and the boiling point of water, at least a stoichiometric equivalent of said semicarbazide salt to said nitro cycloalkane salt being used.

No references cited.